July 24, 1951    J. T. LANDGRAF    2,561,932
FLOAT TYPE IMMERSION HEATER FOR TANKS AND THE LIKE
Filed Jan. 6, 1949
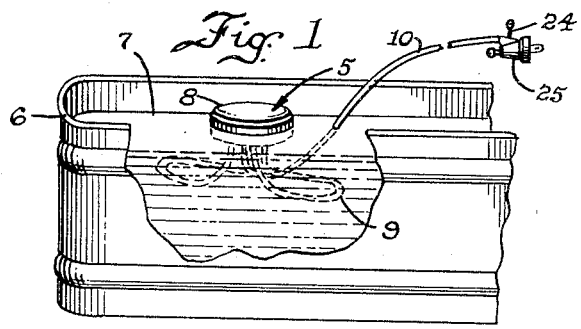
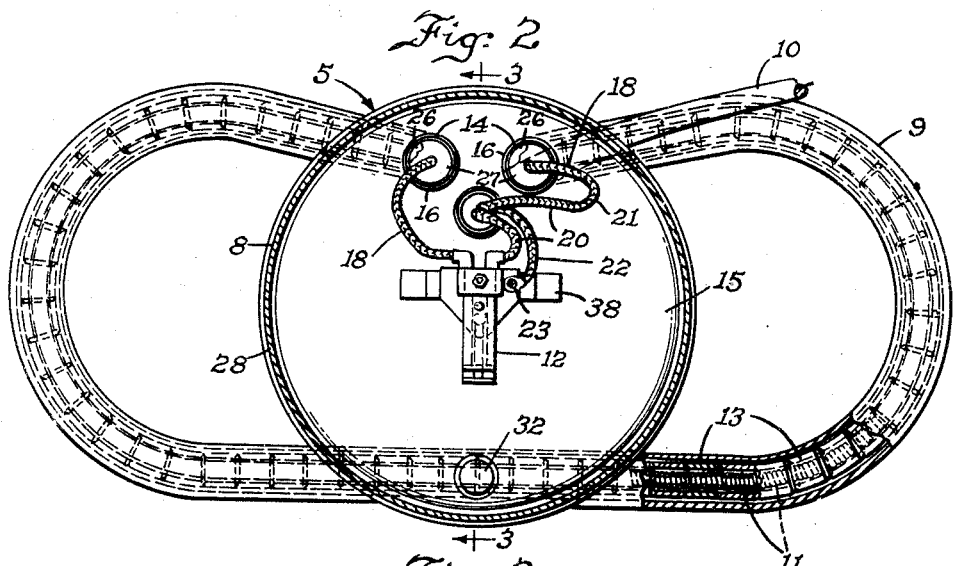
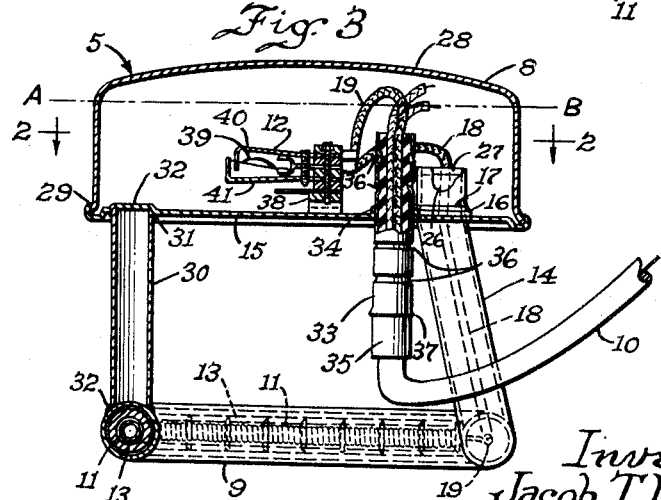
Inventor
Jacob T. Landgraf
Andrew F. Wintercorn
Atty Patented July 24, 1951

2,561,932

UNITED STATES PATENT OFFICE 2,561,932

FLOAT TYPE IMMERSION HEATER FOR TANKS AND THE LIKE

Jacob T. Landgraf, Freeport, Ill., assignor to H. D. Hudson Manufacturing Company, Chicago, Ill., a corporation of Minnesota Application January 6, 1949, Serial No. 69,562

9 Claims. (Cl. 219—41)

This invention relates to immersion type tank heaters and is more particularly concerned with an improved floating portable type electric heater, ideal for stock tanks, hog waterers, milk house tanks, and wherever it is necessary to keep water from freezing.

In the heater of my invention, an oblong or oval-shaped heating coil containing the electrical heating element is suspended from and well beneath the flat bottom of a generally cylindrical float, in which is contained the thermostat responsive substantially solely to temperature change of the water to open and close the circuit through the heating element, this arrangement affording a number of important advantages, to wit:

(1) A low center of gravity, so that the heater rights itself automatically if tipped over or even placed in the water upside down;

(2) The heating portion of the coil is always under water at least three to four inches, so that no current is wasted in heating air and all of the current is used in dissipating heat to the water;

(3) The heating coil being of relatively small diameter tubing is of proportionately light weight, so that a smaller sized float can be used and there is less danger of the heater burning out when the water level gets low, and (4) By extending the conductor cord from the bottom of the float, there is no danger of an animal disturbing it and possibly biting it, with consequent danger of electrocution or putting the heater out of commission.

The invention is illustrated in the accompanying drawing, in which—

Fig. 1 is a perspective view of a stock watering tank illustrating the heater of my invention in use;

Fig. 2 is a plan view of the heater on a larger scale showing the float broken away in the plane of the line 2—2 of Fig. 3, and showing also a portion of the heating coil in section so as to reveal the electrical heating element and the insulators therefor, and Fig. 3 is a cross-section on the line 3—3 of Fig. 2.

The same reference numerals are applied to corresponding parts throughout these views.

Referring to the drawing, the heater of my invention is designated generally by the reference numeral 5 and is shown, in Fig. 1, in use in a watering tank 6 floating in the water 7, the float portion 8 suspending the heating coil 9 about three or four inches below the surface of the water, so that all of the current is used for heating the water and there is none wasted in heating air. The current is supplied to the electrical heating element in the coil 9 through a flexible rubber-covered conductor cord 10 that extends from the bottom of the float 8 and is electrically connected with the heating element 11 through a thermostatic switch 12 that closes the circuit when the temperature of the water drops to about 47° F. and opens the circuit when the temperature of the water is raised to about 57° F.

The heating element 11 is of special resistor wire suitable for heating elements, and is formed like a coiled spring and extends through a series of beads 13 of porcelain, or other suitable refractory material. The heating coil 9 is formed from a single piece of copper tubing bent to oblong or oval shape and has upwardly bent end portions 14 which extend through holes in the flat copper bottom plate 15 of the generally cylindrical float 8, necks 16 being extruded upwardly around the holes in the bottom plate 15 and soldered to the projecting end portions of the tubing, as indicated at 17. As most clearly appears in Fig. 2, the heating coil 9 is in symmetrical balanced relation to the float 8, so that the heater will always float on an even keel and, due to the fact that the bulk of the weight of the heater is in the coil 9 with the element 11 and insulators 13 therein, the heater has a low center of gravity, and, hence, will right itself automatically if it should happen to be tipped over or even placed in the water upside down by someone not familiar with the use of the heater. The electrical heating element 11 extends in the coil 9 only as far as the lower ends of the upwardly bent end portions 14, and there are low resistance conductors 18, which are suitably connected, as at 19, to the ends of the heating element 11 and extend upwardly in the upwardly bent end portions 14 of the coil 9 into the float 8 for electrical connection with the thermostatic switch 12 and with the low resistance conductors 20 in the conductor cord 10, as at 21. Preferably included in the conductor cord 10 is still another low resistance conductor 22 that serves as a ground connection, the inner end portion being grounded on the base of the switch 12, as at 23, and its outer end portion 24 being suitably connected to a metal stake, or the like, that is driven into the ground adjacent the plug receptacle in which the plug 25, provided on the outer end of the cord 10, is entered. Wooden plugs 26 are driven into the projecting end portions of the tubing of the coil 9 and have the conductors 18 extended through center holes provided therein, and refractory cement is filled in over the tops of the plugs 26, as at 27, around the conductors to seal the joints. It is manifest, therefore, that the heat generated by the element 11 is pretty well confined to the horizontal plane of the main body portion of the coil 9 and dissipated in the water well below the level of the float 8, and, hence, the thermostatic switch 12 will not be affected to any measurable degree in its operation by the heat from the element 11, but will respond substantially solely to temperature change of the water around and immediately beneath the float.

The main body portion 28 of the float is in the form of a substantially cylindrical copper cap, the rim of which is suitably soldered, as at 29, to the rim portion of the bottom plate 15. A tubular brace 30 of copper is soldered at its upper end, as at 31, in a recess provided therefor in the bottom plate 15 of the float where the plate is embossed upwardly, and the lower end of the brace is soldered, as at 32, to the top of the heating coil 9, silver solder being employed at these joints to avoid any likelihood of the connections loosening as a result of the solder melting. When the heater is in operation the conductor 10 extends up into the float 8 through a hole in the bottom plate 15, a water-tight connection being obtained by providing a small copper tube 33, which is soldered to the upwardly extruded neck 34 surrounding the hole through which the tube 33 extends, and providing also a piece of rubber tubing 35 closely surrounding the inner end portion of the conductor cord 10, and rolling beads in the tube 33 at spaced intervals, as indicated at 36, above and below the bottom plate, so as to compress the tubing 35 and the rubber covering of the cord 10 therein annularly at each of the four places indicated and, accordingly, seal the connection against seepage of water into the float. The lower end of the tube 33 is suitably flared outwardly, as indicated at 37, so as to protect the tubing 35 against chafing. The thermostatic switch 12 is suitably secured to the top of the bottom plate 15 on a cleat 38 that is soldered to the bottom plate at its opposite ends. The switch 12 may be of any suitable or preferred snap action type, the present one including a snap action element 39 which, when the bimetallic elements 40 and 41 of the switch are distorted in one direction by curling, closes the electrical circuit, and thereafter, when the elements 40 and 41 distort in the opposite direction as a result of the temperature rise, opens the circuit.

This heater is intended merely to keep watering tanks open in cold weather, and the coil 9 is, therefore, located near enough to the surface of the water to accomplish that purpose and yet far enough below the surface so that the water being consumed by the animals will be at a palatable temperature. The water level is approximately on the line A—B, indicated in Fig. 3, so that the heating coil 9 is always under water at least three to four inches to insure having all of the current used in the element 11 used for heating water and not wasted in heating air. It should be clear that the conductor cord 10 extending from the bottom of the float 8 is not apt to be disturbed by the animals drinking from the tank, whereas if it extended from the top of the float where it would be conspicuous, it might easily be bitten by an animal, with the resultant danger of electrocution or putting the heater out of commission.

It is believed the foregoing description conveys a good understanding of the objects and advantages of my invention. The appended claims have been drawn to cover all legitimate modifications and adaptations.

I claim:

1. A non-upsettable, self-righting heater for use in livestock watering tanks, comprising a buoyant body adapted to float on the water in the tank, a rigid substantially horizontal tubular heating coil containing an electrical heating element for heating the same which is adapted to be connected with electrical supply conductor means, and means for suspending said coil in a fixed spaced relation beneath the buoyant body so that the coil is disposed close enough to the buoyant body to keep the water in the vicinity of the body and the body itself free of ice although the coil is spaced far enough below the body to remain clear of the snouts of animals when drinking in the vicinity of the buoyant body and give the heater assembly as a whole a low center of gravity to make it self-righting and resistant to upsetting.

2. A non-upsettable, self-righting heater for use in livestock watering tanks, comprising a buoyant hollow float body adapted to float on the water in the tank, a rigid substantially horizontal tubular heating coil containing an electrical heating element for heating the same which is adapted to be connected with electrical supply conductor means, means for suspending said coil in a fixed spaced relation beneath the buoyant float body so that the coil is disposed close enough to the buoyant float body to keep the water in the vicinity of the body and the body itself free of ice although the coil is spaced far enough below the body to remain clear of the snouts of animals when drinking in the vicinity of the buoyant float body and give the heater assembly as a whole a low center of gravity to make it self-righting and resistant to upsetting, the heating coil having upwardly extending end portions connected to the bottom wall of the buoyant float body in radially inwardly spaced relation to the side wall thereof and forming at least a portion of the means for suspending said coil, and flexible electrical supply conductor means mechanically secured to the bottom wall of said buoyant float body and electrically connected within said body to conductors connected to the ends of the electrical heating element.

3. An immersion heater adapted for use in livestock watering tanks comprising a tubular heat exchange member in the form of a horizontal coil having integral upwardly extending tubular end portions, an electrical resistance element of relatively high resistance inside the horizontal portion of said tubular member, a float communicating with and rigidly connected with the upper ends of said upwardly extending end portions to suspend the tubular member in the liquid to be heated, a thermostatic switch in said float responsive thermostatically to temperature changes in the liquid surrounding the float, and electrical conductors of relatively low resistance connected to said resistance element and extending upwardly inside said upwardly extending end portions into said float and connected in circuit with said switch and extending from the float for connection with a source of electric current supply.

4. A heater as set forth in claim 3 wherein said thermostatic switch is mounted on the bottom of said float in heat conducting relation thereto, and said upwardly extending end portions of said heat exchange member are elongated sufficiently to space the float a predetermined distance from the heated coil portion of said member to more or less isolate the thermostatic switch from the heat of said coil whether transmitted by conduction through the upwardly extending end portions or by convection through the liquid.

5. A heater as set forth in claim 3 including plugs of thermally non-conducting material entered tightly in the upper ends of said upwardly extending end portions to seal off the float from said heat exchange member, said low resistance conductors being extended through these plugs.

6. An immersion heater adapted for use in livestock watering tanks comprising a tubular heat exchange member in the form of a horizontal coil of generally oval form having upwardly extending end portions on one side thereof at the middle, a float disposed above the middle portion of the coil on its longitudinal center line and rigidly connected on one side of center with said upwardly extending end portions, brace means on the other side of the float's center rigidly connecting the coil and float, said float being adapted to suspend the coil horizontally in the liquid to be heated by means of the brace means and the upwardly extending end portions of the coil, an electrical resistance element of relatively high resistance inside said horizontal coil, a thermostatic switch in said float responsive thermostatically to temperature changes in the liquid at and near the surface and connected with said resistance element by low resistance electrical connections extending through said upwardly extending end portions and adapted to connect it with a source of electric current supply and make and break electrical circuit connections with the said source.

7. A heater as set forth in claim 6 including a flexible extension cord carrying conductors connected with said switch and heating element to connect the same with the source of electric current supply, said extension cord being extended from the switch through the bottom of the float.

8. An immersion heater adapted for use in livestock watering tanks comprising a heat exchange member in the form of a horizontal coil, a float having a predetermined volumetric displacement in water in relation to the weight and volumetric displacement of said coil and disposed spaced above the center of mass of the coil, means rigidly connecting said float and coil in the spaced relationship, whereby said float is adapted to suspend the coil in a liquid to be heated in a substantially horizontal position a predetermined distance below the surface of the liquid where the float rides, the coil being of appreciably greater weight than the float, whereby the heater has a low center of gravity and will automatically right itself if upset or placed in the liquid upside down, and an electrical heating element for heating the coil.

9. A heater as set forth in claim 3, including plugs of thermally non-conducting material entered tightly in the upper ends of said upwardly extending end portions to seal off the float from said heat exchange member, said low resistance conductors being extended through these plugs, and a thermostatic switch mounted on the bottom of the float in heat conducting relation thereto and electrically connected with the low resistance conductors and with flexible electrical supply conductor means connected with the float.

JACOB T. LANDGRAF.

REFERENCES CITED

The following references are of record in the file of this patent:

UNITED STATES PATENTS

| Number | Name | Date |
|---|---|---|
| 2,430,272 | Brodie | Nov. 4, 1947 |
| 2,454,091 | Rietz | Nov. 16, 1948 |
| 2,472,178 | Temple | June 7, 1949 |
| 2,520,576 | Stookey | Aug. 29, 1950 |